United States Patent [19]
Windle

[11] 3,913,234
[45] Oct. 21, 1975

[54] APPARATUS FOR MEASURING WALL THICKNESS

[75] Inventor: Tom J. Windle, Bartlesville, Okla.

[73] Assignee: Phillips Petroleum Company, Bartlesville, Okla.

[22] Filed: Apr. 11, 1974

[21] Appl. No.: 460,043

[52] U.S. Cl............ 33/147 E; 33/172 R; 33/174 R; 33/178 R
[51] Int. Cl.²........................................... G01B 5/06
[58] Field of Search........... 33/147 R, 147 E, 147 L, 33/172 R, 172 B, 174 Q, 174 R, 178 R

[56] References Cited
UNITED STATES PATENTS

| | | | |
|---|---|---|---|
| 1,446,149 | 2/1923 | Benoit et al........................ | 33/172 R |
| 1,637,482 | 8/1927 | Graves............................... | 33/147 E |
| 1,892,005 | 12/1932 | Richmond........................... | 33/147 E |
| 2,030,237 | 2/1936 | Brittain et al...................... | 33/174 Q |
| 2,224,728 | 12/1940 | Gulliksen........................... | 33/172 R |
| 2,269,650 | 1/1942 | Cooney.............................. | 33/147 R |
| 2,408,689 | 10/1946 | Seme................................. | 33/174 Q |
| 2,607,127 | 8/1952 | Wagenhals......................... | 33/178 R |

*Primary Examiner*—Richard E. Aegerter
*Assistant Examiner*—Richard R. Stearns

[57] ABSTRACT

An apparatus for measuring the wall thickness of samples, especially pipes, is disclosed. Said apparatus basically comprises a rotatably arranged sample support means and measuring means operably connected to said sample support means. The measuring means measure the wall thickness of a sample arranged on said sample support means. By rotating said sample support means the wall thickness of all portions of the sample is continuously measured.

8 Claims, 2 Drawing Figures

APPARATUS FOR MEASURING WALL THICKNESS

This invention relates to the art of measuring wall thickness. More specifically, this invention relates to the art of measuring the thickness of pipe walls.

BACKGROUND OF THE INVENTION

Especially during the production of pipes, e.g., high molecular weight polyethylene pipes, it is frequently desirable to measure the wall thickness of the pipes produced. In accordance with ASTM D2513-73 8.5.1.2, the wall thickness is to be measured at least at six different locations by means of a tubing micrometer. This necessitates a plurality of measuring steps, and said method therefore is cumbersome and time-consuming.

THE INVENTION

It is therefore one object of this invention to provide an apparatus for measuring the wall thickness of samples.

A further object of this invention is to provide an apparatus for measuring wall thickness of samples, particularly of pipes, which can be used for practically all types and sizes of pipes, particularly plastic pipes.

Figure 1:
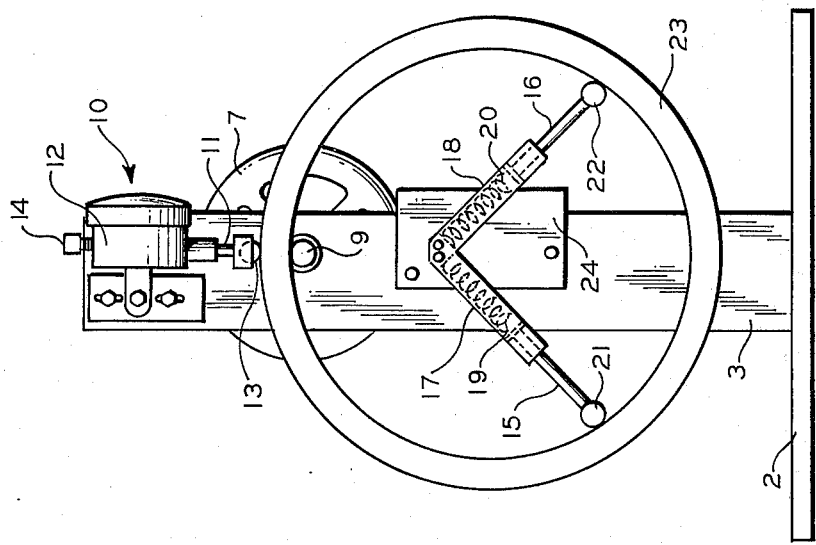
Figure 2:
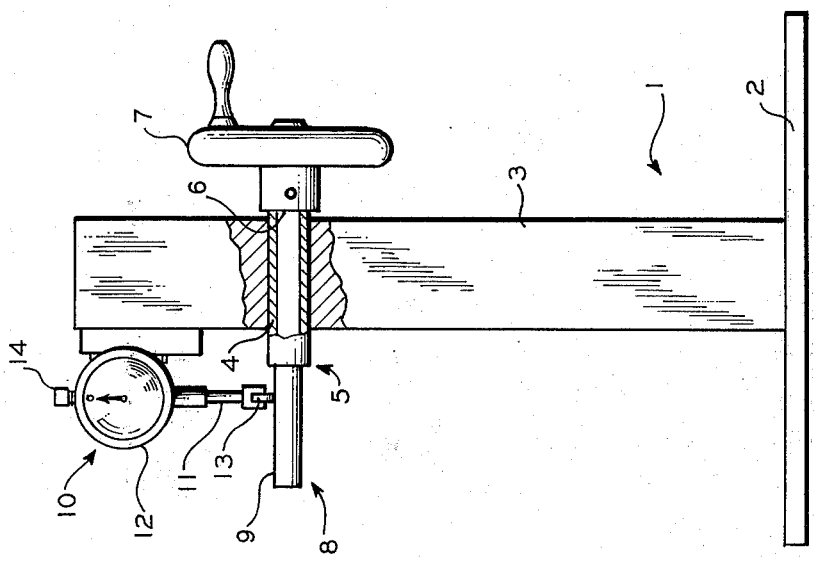

Further aspects, objects and advantages of this invention will become apparent to one skilled in the art from the description of preferred embodiments of the invention and the attached claims in connection with the attached drawings, of which:

FIG. 1 is a side view of an apparatus for measuring the wall thickness of samples, and FIG. 2 is a front view of the apparatus shown in FIG. 1 having an additional stabilizing unit affixed thereto.

I have now developed and designed an apparatus for measuring the wall thickness of samples, particularly of pipes, which apparatus comprises a support, a sample support means being rotatably arranged in said support, and a measuring means comprising a sensing means and a detecting means, said sensing means being arranged in operable relationship with respect to said sample support means so that its position relative to said sample support means is related to the wall thickness of the sample when arranged on said sample support means, and said detecting means being arranged so as to detect the position of said sensing means so as to measure said wall thickness of said sample.

In accordance with one embodiment of this invention, said sample support means is provided with a first cylindrical end portion on which the sample is to be placed during the measuring procedure.

In a further embodiment, the cylindrical end portion of said sample support means extends unsupported from the support and the opposite end portion of said sample support means has attached thereto means for rotating said sample support means.

In a presently preferred embodiment, said measuring means comprises a housing attached to said support, an indicator operably arranged in said housing, a spindle or rod having a first and second end slidably arranged in said housing, said spindle or rod being in operable relationship with said indicator and displacing said indicator when slid, said first end of spindle or rod contacting the first cylindrical end portion of said sample support means or the sample, respectively.

Further details and preferred embodiments are shown in the following detailed description of the drawings.

As shown in FIG. 1, which represents a presently preferred embodiment of the apparatus of this invention, there is provided a base unit 1 comprising a base plate 2 and a support 3. In the upper section of the support 3, a bearing 4 with horizontal axis is affixed. In this bearing 4 a sample support means in the form of a mandrel or anvil 5 is arranged. Bearing 4 is preferably tightly fitted using a polyethylene or polytetrafluoroethylene (Teflon) bearing. The mandrel 5 comprises a first end portion 8 and a second end portion 6 to which a hand wheel 7 is attached. The first end portion 8 of the mandrel 5 is unsupported and has a cylindrically shaped portion 9. This cylindrically shaped portion 9, which is grit-blasted to roughen its surface, carries the samples to be measured, as for instance shown in FIG. 2. A sprocket wheel connected by chain drive to a gear motor can be substituted for hand wheel 7. This motor method is preferred to belt drive to minimize slippage.

To the upper end of support 3 a conventional dial indicator 10, such as the dial indicator No. 25-441 Starrett Continuous Dial Indicator 0.001 Grad., is attached. This dial indicator 10 comprises a spindle 11 extending through a dial housing 12. The dial indicator 10 is arranged such as to allow a vertical movement of spindle 11. Spindle 11 when moved turns an indicator hand, thus showing the length of movement of the spindle.

At the lower end of the spindle 11, a small wheel 13 is fitted which can be the commercially available No. 25W Starrett Dial Indicator Roller Contact Point. The wheel 13 is arranged so that its axis of rotation is parallel to the coextensive axis of the cylindrical portion 9 and of the bearing 4. The wheel 13 largely reduces the friction between the sample and the spindle during the measuring cycle.

On the top end of the spindle 11 a weight 14 is arranged. This weight is provided to exert fixed downward pressure on the sample. The pressure is in the range of 2 to 8 ounces. If the samples are large-diameter pipes, greater weights are preferred. The dial indicator 10 shows the distance between the lower side of the wheel 13 and the upper side of the cylindrical portion 9 of anvil 5. When there is no sample between wheel 13 and the cylindrical portion 9, the dial indicator will show zero as indicated in FIG. 1.

In a further embodiment of this invention as shown in FIG. 2, the apparatus of FIG. 1 can be provided with two spring-loaded support bars 15 and 16. These bars are slidably arranged in guides 17 and 18. In addition, the bars 15 and 16 are spring-loaded as indicated by the springs 19 and 20. At the end of each bar 15 and 16, rollers 21 and 22 are installed which contact the interior surface of a large-diameter sample pipe 23. The axis of rotation of these rotatably arranged rollers 21 and 22 is parallel to the coextensive axis of the cylindrical portion 9 and the bearing 4. The bars 15 and 16 serve to stabilize the pipe 23, and the rollers 21 and 22 reduce the friction between the pipe and the bars during operation. The whole stabilizing device consisting of the guides 17, 18, the springs 19, 20, the bars 15, 16, and the rollers 21, 22, can be removably attached to support 3 by a connecting plate 24. The guides 17, 18 can be arranged inside or outside of the area of the sample pipe. If the guides 17 and 18 are arranged outside of said area, the bars 15 and 16 with the rollers 21 and 22 can be constructed so that they can be shifted into contact with the large-diameter pipe 23 or shifted out of the area of said pipe.

During operation, the spindle 11 of the dial indicator 10 is raised and the sample, e.g., the pipe 23, is lifted onto the cylindrical portion 9 of the sample support means 5. The spindle 11 is then lowered so that the weight 14 brings the wheel 13 into firm and constant contact with the external wall of said sample pipe 23. The wheel 7 is then slowly turned. Thereby the pipe sample 23 is also slowly turned. The dial 10 continuously indicates the wall thickness of said pipe sample which slowly moves between the cylindrical portion 9 of the sample-carrying unit or mandrel 5 and the wheel 13. Thus, wall thickness deviations or the uniformity of pipes are quickly and accurately determined. One to three revolutions of the pipe sample 23 are sufficient to assure accurate determinations. If a permanent record is desired, a sensing element attached to a chart recorder can be substituted for or added to the indicator dial 12.

The mandrel 5 can be made detachable and a set of mandrels with varying diameters of the cylindrical portion 9 can be provided. The rotation of the mandrel can be done by hand or by an electrically operated rotating means, e.g., an electric motor driving a transmission chain connected with a sprocket on the mandrel 5.

Reasonable variations and modifications, which will be apparent to those skilled in the art, can be made in this invention without departing from the spirit or scope thereof.

I claim:

1. Apparatus for measuring the wall thickness of a pipe sample comprising
    a. a support;
    b. a sample support means having a first and a second end portion and being rotatably arranged in a bearing, said bearing being fixed to said support with its axis horizontally arranged, said first end portion being cylindrically shaped for carrying said pipe sample, the axis of said first end portion being coextensive with the axis of the bearing;
    c. means for rotating said sample support means in said bearing; and
    d. measuring means attached to said support comprising
        aa. a sensing means to contact the upper external side of the pipe sample; and
        bb. indicating means operatively connected to said sensing means to indicate the distance between said first cylindrical end portion and said sensing means.

2. Apparatus in accordance with claim 1 wherein said first cylindrical end portion of said sample support means extends unsupported from the support and wherein said means for rotating said sample support means are attached to the second end portion of said sample support means.

3. Apparatus in accordance with claim 1 wherein said measuring means comprise a dial indicator consisting essentially of
    a. a housing;
    b. as said indicating means an indicator hand in said housing; and
    c. a spindle vertically slidably arranged in said housing, said spindle having a first and a second end, said first end being said sensing means to contact the upper external side of said pipe sample and said second end being operatively connected to the indicator hand to indicate a movement of said spindle.

4. Apparatus in accordance with claim 3 wherein said sensing means is a wheel rotatably attached to said first end of said spindle.

5. Apparatus in accordance with claim 3 wherein a weight is fixed to said second end of said spindle.

6. Apparatus in accordance with claim 1 wherein a stabilizing unit is attached to the support, said stabilizing unit comprising a stabilizing means contacting the interior surface of said pipe sample so as to exert a stabilizing force to the pipe sample during the rotation thereof.

7. Apparatus in accordance with claim 6 wherein the stabilizing unit comprises two guides and two bars slidably arranged therein, said bars being spring loaded to outwardly bias said bars, the end portions of said bars contacting the interior of said pipe sample.

8. Apparatus in accordance with claim 7 wherein wheels are rotatably attached to the end of the end portions of the two bars.

* * * * *